(12) United States Patent
Border et al.

(10) Patent No.: US 8,154,582 B2
(45) Date of Patent: Apr. 10, 2012

(54) DISPLAY DEVICE WITH CAPTURE CAPABILITIES

(75) Inventors: John N. Border, Walworth, NY (US); Lynn Schilling-Benz, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 1208 days.

(21) Appl. No.: 11/874,954

(22) Filed: Oct. 19, 2007

(65) Prior Publication Data

US 2009/0102763 A1 Apr. 23, 2009

(51) Int. Cl.
*H04N 7/14* (2006.01)
(52) U.S. Cl. ............. 348/14.08; 348/14.12; 345/50
(58) Field of Classification Search ........... 348/14.01, 348/14.02, 14.03, 14.04, 14.08, 14.12; 345/24, 345/25, 26, 27, 28, 50, 156; 382/312
See application file for complete search history.

(56) References Cited

U.S. PATENT DOCUMENTS

| | | | |
|---|---|---|---|
| 5,159,445 A * | 10/1992 | Gitlin et al. | 348/14.01 |
| 5,340,978 A | 8/1994 | Rostoker et al. | |

| | | | |
|---|---|---|---|
| 2004/0257473 A1 | 12/2004 | Miyagawa | |
| 2005/0024489 A1 | 2/2005 | Fredlund et al. | |
| 2007/0002130 A1 | 1/2007 | Hartkop | |

FOREIGN PATENT DOCUMENTS

| | | |
|---|---|---|
| EP | 1 209 901 | 5/2002 |
| JP | 2000-298253 | 10/2000 |
| JP | 2007-082107 | 3/2007 |

OTHER PUBLICATIONS

U.S. Appl. No. 11/756,562, filed May 31, 2007.
David R. Jenkins; Deingeman C. Beuzekom, Gerry Kollman; C. Benjamin Wooley; Ron Rykowski; Digital Imaging Colorimeter for Fast Measurement of Chromaticity Coordinate and Luminance Uniformity of Displays; Proc. SPIE 4295, 176 (Apr. 30, 2001).
Ehsan Samei; Assessment of Display Performance for Medical Imaging Systems: Executive Summary of AAPM TG18 Report; Med. Phys. 32 (4) Apr. 2005.

* cited by examiner

*Primary Examiner* — Brian Ensey
(74) *Attorney, Agent, or Firm* — Frank Dincelli; Raymond L. Owens

(57) ABSTRACT

An image capture and display device is described. The device includes a liquid crystal display panel, which can switch between two states, a display state and the capture state. Wherein at least a portion of the display and a switchable diffuser become transparent in the capture state. One or more image capture devices are located behind the display. Holes or windows are provided in the backlight for the image capture devices to capture images of the scene in front of the device when in the capture state.

24 Claims, 16 Drawing Sheets

DISPLAY DEVICE WITH CAPTURE CAPABILITIES

FIELD OF THE INVENTION

The present invention relates to an electronic image capture and display device, and in particular to an image capture and display device of the type employing an image capture device to capture an image of a subject and a uniform light panel device to display images.

BACKGROUND OF THE INVENTION

Devices which combine image display capabilities with image capture capabilities are well known with the most well known form being the combination of the laptop computer with the webcam. This combination enables the simultaneous display of images with the capture of images of the scene in front of a laptop computer. As communication bandwidth increases the use of visual communication techniques, such as video communication becomes increasingly popular. However, there remains a need for an integrated device that integrates the image capture capabilities into the display, both to simplify the operation for the user and to enable an improved capture of the scene that the displayed image is being shown to. This is particularly important when considering video communication where it is desirable to capture an image of the viewer such that their eye gaze appears to be looking directly at another viewer when their image is displayed on the other viewer's display. This need for an integrated device extends across all displays from large wall displays to small hand held displays such as cell phones.

Liquid crystal displays (LCD) are well known in the art. LCDs with backlight assemblies that include a light guide or a distributed illumination panel constitute a uniform light panel with a thin format and as such are desirable for many display applications where space is limited, including but not limited to: cell phone displays, computer monitors, laptops, televisions and automobile displays. The invention discloses a modified LCD with a backlight assembly that includes a light guide or a distributed illumination panel in a uniform light panel that comprises a thin display with an integrated image capture device. The thin display with integrated capture can be used for visual exchanges or video communication with another user. The thin display with integrated capture can also be used as a digital mirror device. In addition, the thin display with integrated capture can be used to collect information about the scene in front of the display to optimize the display parameters or to tailor the content displayed.

Thin displays are generally desirable for most display applications. LCD type displays tend to be much thinner than cathode ray tube (CRT) displays, as such they are more desirable for large screen displays since they take up less room in the home or office. Typical thicknesses are 50 mm in depth for an LCD television as compared to 400 mm in depth or more for a CRT television. The thinner form factor of LCD type displays makes them much more suited to portable devices where thin form factors are very important, and the thickness of cell phone and laptop displays can drop below 5 mm. In fact Samsung Electronics Co. (Seoul, Korea) has announced a new type of LCD display called i-Lens that has a reported display panel thickness of 0.82 mm. In such applications, it is desirable that the addition of an integrated image capture device should not increase the thickness of the display device substantially.

In U.S. Pat. No. 5,340,978 entitled "Image Sensing Display Panels with LCD Display Panel and Photosensitive Element array", Rostoker et al describe an image sensor with distributed image capture that can be used in an image sensing display panel. However, in the embodiments disclosed by Rostoker, the photosensitive elements will interfere with the backlight operation causing low overall brightness or shadowing in the displayed image or shadowing in the captured image. In Col. 15, Line 18-23, Rostoker states that "backlighting will generally interfere with the operation of the photosensitive array. As a result, it will be necessary to "turn off" the backlighting means while the video signal from the photosensitive array is being monitored." Backlights with fluorescent light sources cannot be turned off quickly and any time that the backlight is turned off will decrease the perceived brightness of the displayed image.

In United States Patent Application US 2004/0257473, entitled "Display device having an image pickup function and a two-way communication system", Miyagawa describes a display device having light emitting pixels with transmittancy and an image capture device which captures an image through the display. Miyagawa discloses light emitting pixels and as such does not address an LCD with a backlight assembly wherein the light is provided by a backlight that includes a light guide. The light emitting pixels as disclosed by Miyagawa, either are transparent and emit light equally toward the display side and the capture side, thereby reducing efficiency or the light emitting pixels are opaque and emit only on the display side thereby interfering with the incoming light for the image capture. In addition, Miyagawa addresses stray light in the captured image by correcting the image after it has been captured using a correction circuit (paragraph 0117) and does not attempt to reduce the stray light which contributes to a reduction in contrast in the image due to flare and a loss in dynamic range of the image. Further, the angled mirror device described by Miyagawa increases the thickness of the image capture and display device substantially. In one embodiment, Miyagawa describes using an LCD panel with an aperture in the polarization plate to allow the image capture device to see through the panel, however the aperture creates an area in the display where an image cannot be displayed.

In United States Patent Application US 2005/0024489 entitled "Image Capture and Display Device", Fredlund et al disclose a display device for capturing and displaying images along a single optical axis. In the device described by Fredlund, the backlight includes an angled mirror and a light which is reflected off the mirror from a remote location as well as a remote location for the image capture device. In addition, Fredlund discloses a flickering light to reduce stray light during image capture similar to Rostoker. The solution described by Fredlund is not well suited to making a thin or compact display and capture device.

In U.S. Pat. No. 5,159,445 entitled "Teleconferencing Video Display System for Improving Eye Contact", Gitlin describes a LCD display with a backlight assembly that has a hole for a camera. However, the backlight assembly described by Gitlin includes a reflector without a light guide that is not well suited to providing a uniform illumination to the display.

Uniform illumination is important to the perceived image quality of the display. In "Digital Imaging Colorimeter for Fast Measurement of Chromaticity Coordinate and Luminance Uniformity of Displays" by D. R. Jenkins, D. C. Beuzekom, G Kollman, C. B Wooley, R. Rykowski; SPIE Proceedings of Flat Panel Display Technology and Display Metrology II Volume 4295, April 2001, pp 176-187, uniformity of illumination in displays and the measurement of uniformity is discussed with 23-25% non-uniformity presented as typical for an LCD when measured at 9 points across the display. In "Assessment of Display Performance for Medical Imaging Systems: Executive Summary of AAPM TG18 Report" by E. Samei et al., Medical Physics, Vol. 32, No 4, April 2005, pp 1205-1225, it is recommended on pp 1206 that for medical displays, the non-uniformity should be less than 30%. Consequently, uniform illumination is important for the display. It is desirable that when adding an integrated image capture device that it should not noticeably degrade the uniformity of the display.

While image capture and display devices have been described in the prior art, there remains a need to provide an image capture and display device, which is thin and provides a substantially uniform displayed image. To enable high quality imaging on the display, means are required to reduce the non-uniformity in backlight illumination due to the presence of the image capture device. The display must also allow for high quality images to be captured while the image capture device remains unobservable. In addition, techniques to reduce stray light from impinging on the image capture device and thereby reducing captured image quality are needed.

SUMMARY OF THE INVENTION

In accordance with one aspect of the present invention there is provided an image capture and display device for capturing and displaying images comprising:
  a. an LCD display panel having a front display side and a back side, the LCD display panel being capable of being alternately placed in a first state for display of an image and a second state wherein at least a portion of the LCD display panel is substantially transparent;
  b. a backlight device disposed behind the LCD display panel for providing a substantially uniform light to the back side of the LCD display panel, the backlight device comprising a uniform light panel having a front surface facing the back side of the LCD display panel, a back surface, a reflective layer is provided at the back surface, and a light source for providing light to the uniform light panel, the reflective layer causing light from the light source to be directed toward LCD display panel;
  c. a diffusing element placed between the LCD display panel and the backlight device, the diffusing element having at least a portion thereof capable of being alternately placed in a first state wherein the portion is substantially transparent and a second state wherein the diffusing element diffuses the light from the uniform light panel being transmitted to the LCD display panel; and
  d. an image capture device positioned behind the diffusing element for capturing an image of a scene positioned in front of the LCD display panel, the image capture device being positioned substantially adjacent to or integrally with the uniform light panel.

In accordance with another aspect of the present invention there is provided a method for capturing and displaying an image using an LCD device having an LCD display panel having a front display side and a back side, the LCD display panel being capable of being alternately placed in a first state wherein at least a portion of the LCD display panel is substantially transparent and a second state wherein an image can be displayed on the LCD display panel, a uniform light panel disposed behind the LCD display panel for providing a substantially uniform light to the back side of the LCD display panel, a diffusing element placed between the LCD display panel and the uniform light panel, portions of the diffusing element being capable of being alternately placed in a first state wherein the diffusing element is substantially transparent and a second state wherein the diffusing element diffuses the light from the light source being transmitted to the LCD display panel; and an image capture device positioned behind the diffusing element, for capturing an image of a scene positioned on the other side of the LCD display panel, comprising the steps of:
  a. alternating portions of the diffusing element between the first and second states at a rate that is not noticeable by an observer of the LCD device;
  b. alternating the LCD display panel between the first and second states at a rate that is not noticeable by an observer of the LCD device
  c. providing an image on the LCD display panel when the LCD display panel is in the second state and when the diffusing element is in the second state; and
  d. capturing an image of a scene by the image capture device when the diffusing element is in the first state and the LCD display panel is in the first state.

In accordance with yet another aspect of the present invention there is provided an image capture and display device, comprising:
  a. a display panel having a front display side and a back side, the display panel being capable of being alternately placed in a first state for display of an image and a second state wherein at least a portion of the display panel is substantially transparent;
  b. a diffusing element placed behind the display panel, the diffusing element having at least a portion thereof capable of being alternately placed in a first state wherein the portion is substantially transparent and a second state wherein the diffusing element diffuses the light from the uniform light panel being transmitted to the display panel; and
  c. an image capture device positioned integrally or adjacent to the diffusing element for capturing an image of a scene positioned on the other side of the display panel.

BRIEF DESCRIPTIONS OF THE DRAWINGS

DETAILED DESCRIPTION OF THE INVENTION

The invention provides an image capture and display device with a thin form factor. The image capture and display device includes a display device with an integrated image capture device. Display non-uniformity caused by the integrated image capture device is reduced by additional modifications.

A thin form factor is provided by using small image capture devices and integrating the image device into the light panel in the backlight assembly of an LCD display panel.

Uniformity over the display is improved by using a diffuser between the backlight and the LCD wherein at least portions of the diffuser are switchable between a diffusing state and a transparent state. In addition, the image capture device and the backlight are configured to make the image capture device substantially unobservable.

Improved image capture quality is provided by switching portions of the LCD and portions of the diffuser into transparent states during image capture so that a transparent region is created over the image capture device during image capture. In addition, the backlight is configured and light shields can be used to reduce stray light impinging on the image capture device and more specifically, stray light is blocked from entering the lens of the image capture device during image capture.

The invention provides for one or more image capture devices to be included behind the LCD display panel to capture still images, motion images, or videos of an object in front of the display while alternately displaying an image. By switching the image capture and display device rapidly between a capture state and a display state, the display will appear to a viewer to be continuously in the display state. Further, by placing the image capture device behind the central region of the LCD panel, the appearance is that of the viewer looking straight into the camera, which improves the perceived eye contact between users of multiple image capture and display devices as described by the invention in a video communication. Multiple image capture devices with different image capture capabilities can be placed behind the display in various locations to allow wider angle capture, different vantage points, close-up views across the display, or to provide image data useful in optimization of a captured image.

Figure 1:
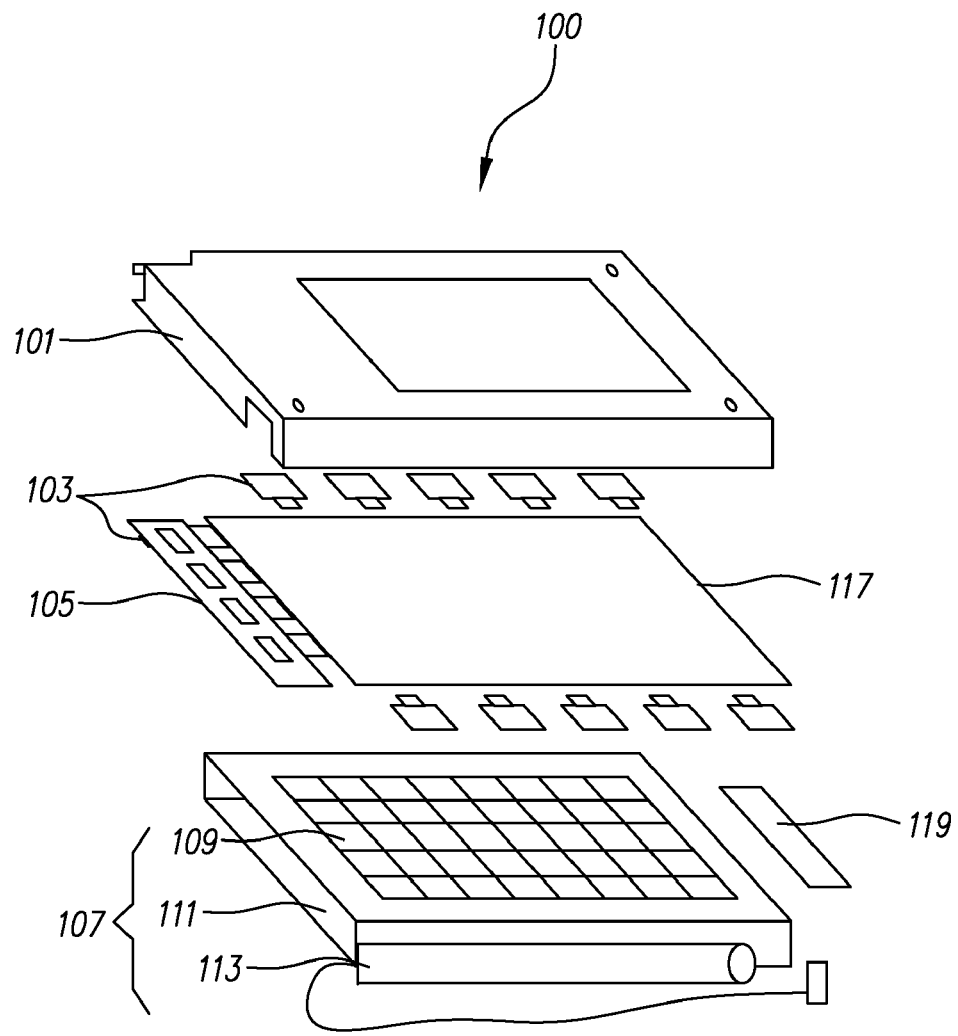
FIG. 1 illustrates an exploded assembly drawing of a PRIOR ART LCD device showing the functional components.

Two key challenges must be overcome to achieve capture and display states in such a way that good image quality is attained in the captured images, and good image quality is attained in the displayed images: the optical path from the image capture device through the LCD panel must be highly transparent; the backlight must provide very uniform light over the LCD surface. The problem is illustrated with the aid of FIGS. 1 and 2, which show the major components of prior art LCD display assembly 100. The LCD assembly includes: a mechanical frame 101, transmission control protocol (TCP) drivers 103, an interface controller 105, a backlight system 107, the LCD panel 117 and an inverter 119. The functional components of interest here are the backlight system 107 and the LCD panel 117. The backlight system is typically composed of backlight bulbs 113 (which can be fluorescent tubes or light emitting diodes (LEDs) located along one or two of the edges of the light guide plate 111, and a diffuser 109. Wherein the diffuser 109 can be made from several different optical films as is well know in the art. The light guide plate 111 typically has scattering elements 230 (shown in FIG. 2) on the backside of the light guide plate 111 to scatter light that has been conducted from the backlight bulbs 113 into the light guide plate 111, toward the front side of the LCD display assembly 100. To improve the uniformity of the light going through the LCD panel 117 and to make the scattering elements less visible from the front side of the LCD, a diffuser 109 is placed on the front side of the backlight system 107. While the diffuser 109 improves the displayed image quality, an image captured by an image capture device 16 looking through diffuser 109 would appear blurry with poor contrast. This problem can be solved by using a switchable diffuser 13 that can be rapidly switched from a transparent state to a frosted or diffusive state. An example of a switchable diffuser 13 is a cholesteric liquid crystal that is clear when it is energized and milky white when it is not energized. Examples of products that could be used as switchable diffusers 13 are optical shutters from LCTech Inc. and "privacy glass" from Switchlite Inc. These devices can be switched between the clear and diffusive states in 0.001 sec or less.

Figure 2:
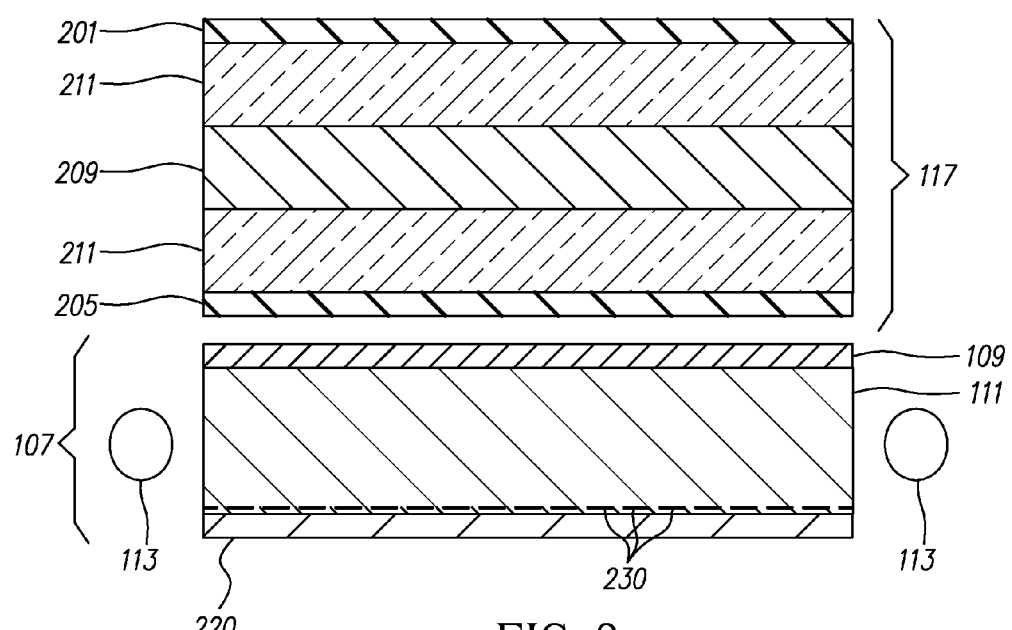
FIG. 2 is a cross sectional view of the PRIOR ART LCD display assembly device of FIG. 1.

Referring in particular to FIG. 2, there is illustrated a cross sectional view of the prior art LCD with a backlight. Unpolarized light from the backlight bulbs 113 enters laterally through the backlight light guide 111. The light is scattered by the scattering elements 230. The reflective sheet 220 causes the scattered light traveling in the direction away from the LCD panel 117 to move forward through the backlight light guide 111, through the diffuser 109 and through the first polarizer 205, which polarizes the light. The polarized light then passes through a first glass plate 211, the liquid crystal molecules 209, a second glass plate 211 and a second polarizer 201. Wherein the glass plates 211 have transparent conductors for each pixel so an electric field can be established between the two glass plates 211 when a voltage is applied between the two glass plates 211. In a twisted nematic LCD, as is well known to those studied in the art of displays, liquid crystal molecules 209 are sandwiched between the two glass plates 211 that rotate the polarization of light passing through by 90 degrees when the voltage is OFF and allow the polarization of light to pass through unrotated when the voltage is ON. The polarization direction of polarizer 201 is oriented 90 degress (perpendicular) to the polarization direction of polarizer 205 to create crossed polarizers on either side of the liquid crystal molecules 209. A bright pixel is produced when the voltage is OFF and the light can pass through both polarizers 201 and 205 because the liquid crystal molecules 209 rotate the polarization of the light produced by polarizer 205 by 90 degrees so it can then pass through polarizer 201. A dark pixel is produced when the voltage is ON, so the liquid crystal molecules 209 do not rotate the polarization produced by polarizer 205 and the light is subsequently blocked by polarizer 201. Thus when an LCD pixel is in a bright state, the LCD appears transparent and the light coming from the backlight system 107 shines through the LCD panel 117 creating a bright pixel. Conversely, when the pixel is in a dark state, the liquid crystal does not rotate the light, and the light coming from the backlight system 107 cannot pass through. (As is well know to those skilled in the art, colors are achieved by placing appropriate color filters in front of pixels). The LCD panel 117 can be rendered transparent over a portion of the display area by causing all the pixels in the portion of the display area to be in the bright state thereby allowing the light from the backlight system 107 to pass through the LCD panel 117. When a white image is displayed on the LCD panel 117, the pixels are in the bright state (transparent) and the white light from the backlight system 107 passes through the LCD panel and is displayed.

Figure 3A:
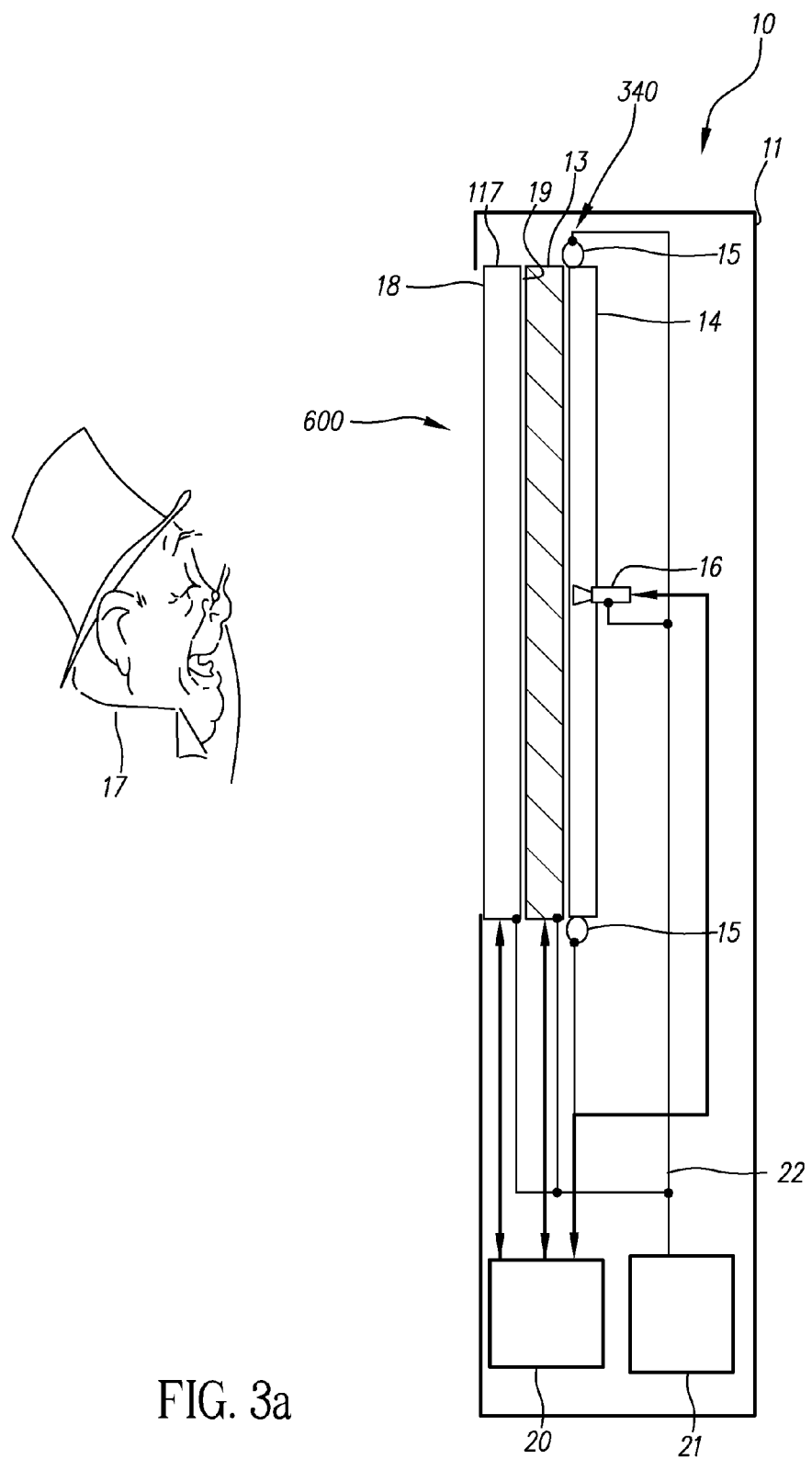
FIG. 3a is a cross-sectional schematic diagram of an image capture and display device according to one embodiment of the present invention.
Figure 3B:
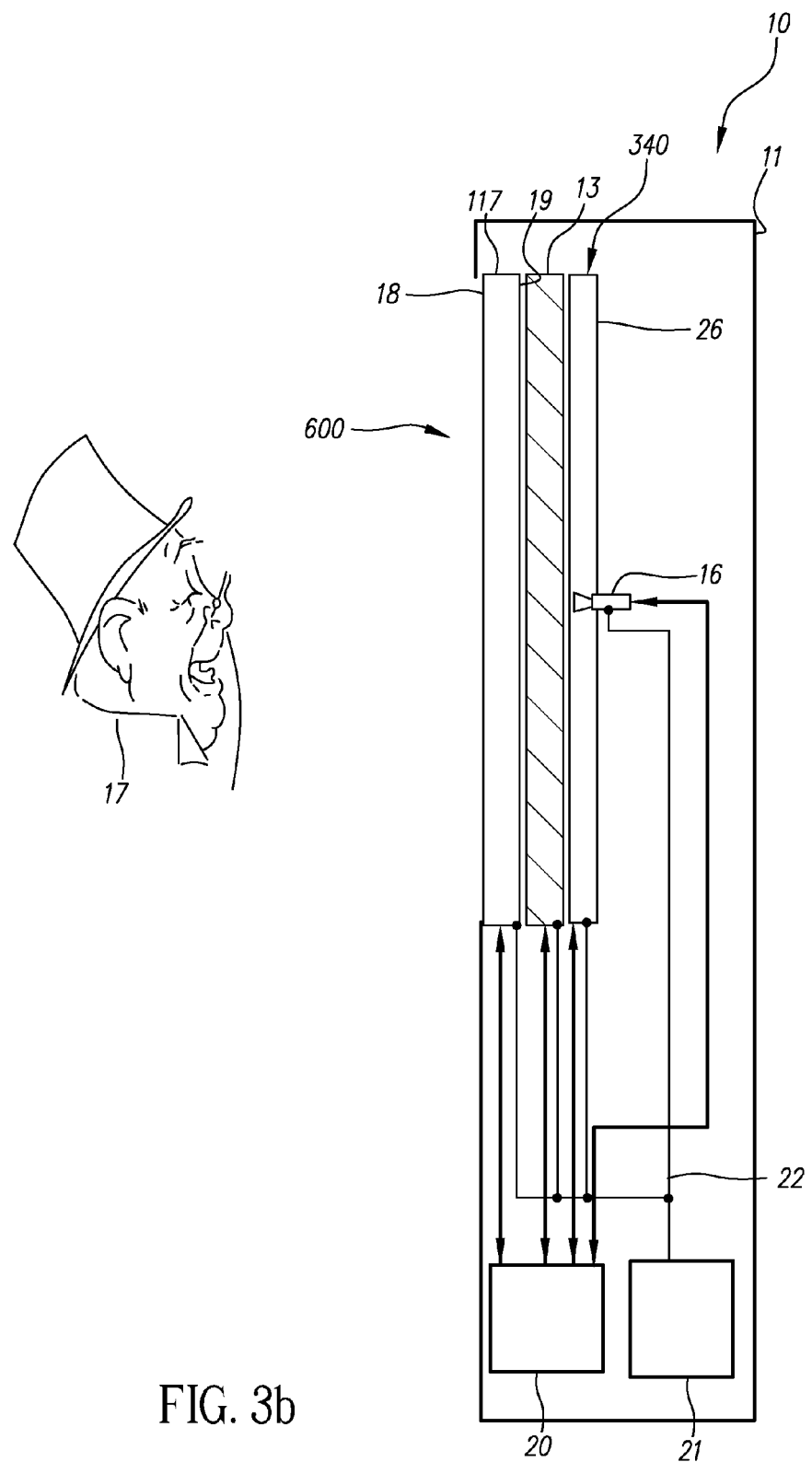
FIG. 3b is a cross-sectional schematic diagram of an image capture and display device according to another embodiment of the present invention showing a distributed illumination panel.
Figure 4A:
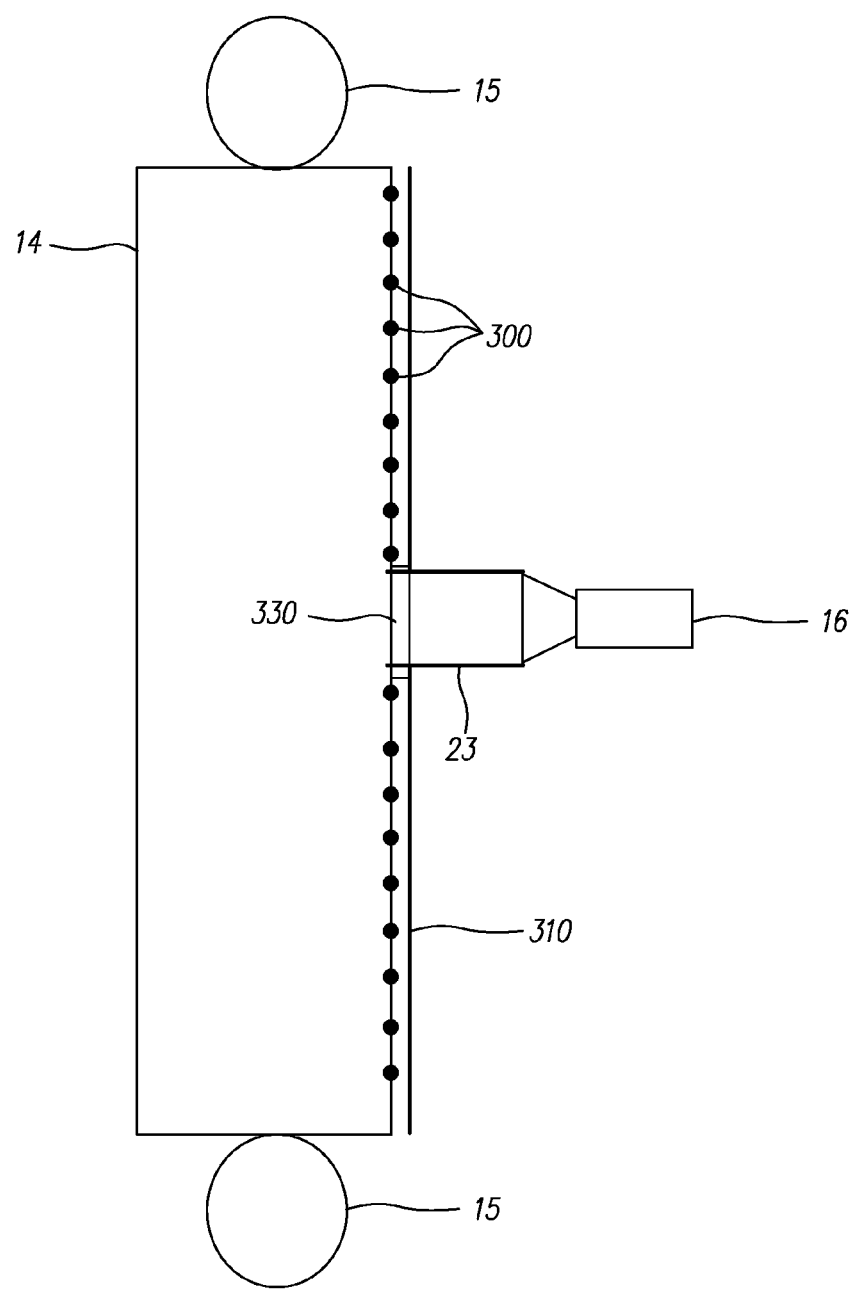
FIG. 4a is a partial cross-sectional view of an image capture and display device, showing one possible configuration in which the image capture device is placed behind the light guide and an optional light shield is utilized.
Figure 4B:
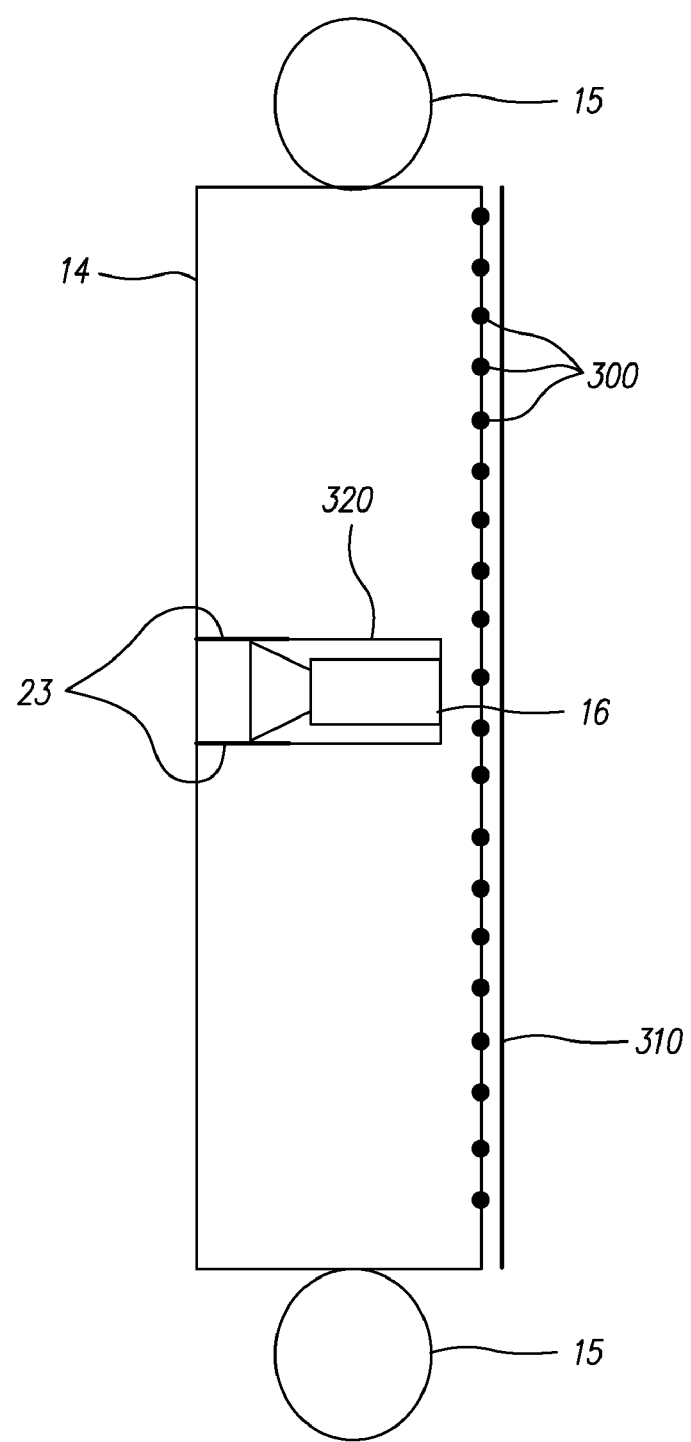
FIG. 4b is a partial cross-sectional view of an image capture and display device, showing another possible configuration in which the image capture device is placed within the light guide and an optional light shield is utilized.
Figure 4C:
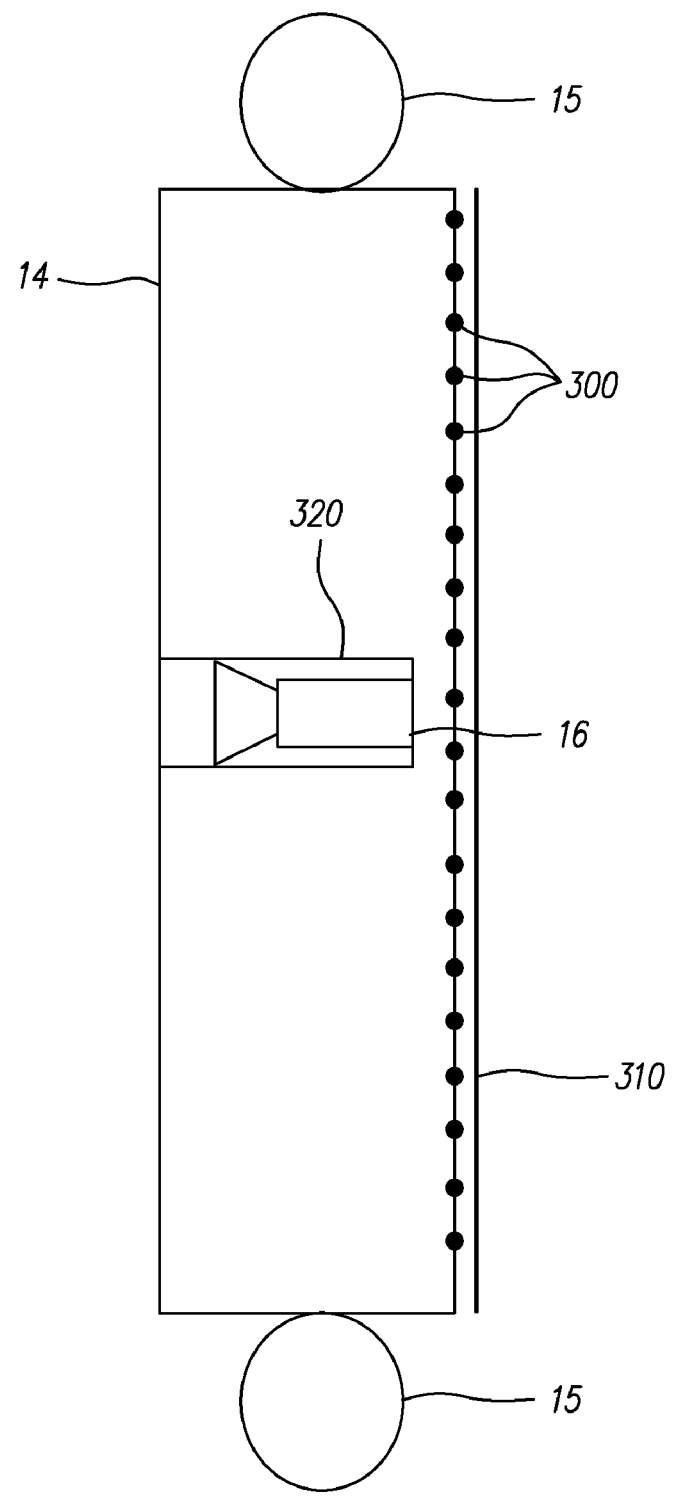
FIG. 4c is a partial cross-sectional view of an image capture and display device, showing yet another possible configuration in which the image capture device is placed within the light guide, flush with the front side of said light guide, and no light shields are utilized.

Referring to FIG. 3a, the essential elements of an image capture and display device 10 made in accordance with present invention are illustrated. The image capture and display device 10 can be contained within an enclosure 11 such as a cabinet with an opening or window 600 on the front side. A LCD panel 117 is located along the front side of the enclosure, adjacent to the opening or window 600. The LCD panel 117 has a front display side 18 and a back side 19. (Note that all functional components of the LCD panel 117, as shown in FIG. 2, are included in the LCD panel 117 shown in FIG. 3, in particular the crossed polarizers 201 and 205 are included.) Behind the LCD panel 117 is a switchable diffuser 13, capable of being electronically switched rapidly from a diffusive state (or scattering state) to a transparent state. Behind the switchable diffuser 13 is a uniform light panel comprising a backlight system 340, consisting of, for example, a backlight light guide 14 and a backlight light source 15, or alternately the backlight system 340 can consist of a distributed illumination panel 26 as shown in FIG. 3b as described later herein. Backlight light sources 15 can include fluorescent lights, cold cathode ray tubes or LED's. In addition, an image capture device 16 or a plurality of image capture devices 16 are placed behind the switchable diffuser 13 and either behind the light guide 14 or in a hole or opening within the light guide 14, as shown in FIGS. 4a, 4b and 4c as is also described later herein. A control system, such as a computer and drivers 20 control the operation of the LCD panel 117, the switchable diffuser 13, and the image capture device(s) 16. One or more power sources 21 provide the power necessary to operate the LCD panel 117, the switchable diffuser 13, the backlight light source 15, and the image capture device(s) 16 via electrical leads 22 or some other form of energy transfer.

The modifications to the LCD display assembly 100 to enable it to become an image capture and display device 10 as shown in FIG. 3 are then as follows. One or more image capture devices 16, such as digital cameras are placed behind the LCD panel 117. Diffuser 109 is removed from the backlight system 107 and replaced with a switchable diffuser 13 that can be switched between a diffuse state (acting as a diffuser for the back light system during image display) and a transparent state, allowing the image capture device 16 to see through it during image capture. It should be noted that the switchable diffuser 13 can be used over the entire display area as shown in FIG. 3, or they can be employed in portions of the display area in the area(s) in front of the image capture device(s) 16. In the latter case, the diffuser 109 would only be replaced by a switchable diffuser 13 in the area(s) in front of the image capture device(s) 16 to form a composite diffuser 27, consisting of a non-switchable portion and a switchable portion. Scattering elements 300 are also removed from the backside of the light guide 14 in front of the image capture device 16 to create a transparent window 330 for image capture, as shown in FIG. 4a. Alternately, the aperture of image capture device 16 and the spacing between the scattering elements are matched so that the image capture device 16 can see between the scattering elements 300. In a further option, Fourier filtering or electronic means (filtering algorithms or corrections to the captured image due to luminance variations) are used to reduce the effects of the scattering elements on image quality.

White images are interwoven with the images that contain the image content to be displayed. It should be noted that only the portion of the image displayed in front of the image capture device 16 needs to be white, although it need not be limited to this area. As was described previously, in the white portions of the displayed images, the pixels are in the bright state and the LCD panel 117 is transparent. Simultaneously when the LCD panel 117 is transparent, the switchable diffuser 13 is also put in its transparent state to create a transparent window through the LCD panel 117 and the switchable diffuser 13 to enable the image capture device 16 to capture an image. When the image capture and display device 10 is in its capture state, the LCD panel 117 and the switchable diffuser 13 (or portions thereof located over the image capture device(s) 16) is transparent, the image capture device 16 located behind the switchable diffuser 13 then captures images of the scene in front of the image capture and display device 10 (i.e. images of the viewer 17, the surrounding area, or other objects). When the image capture and display device 10 is in its display state, the LCD panel 117 displays an image over the entire display area (without inserting additional white areas) and the switchable diffuser 13 is in its diffusive state so that the display functions normally and complete images are displayed. When capture states and display states are alternated at a fast enough rate, the viewer 17 experiences a non-flickering display, and the set of captured images form a non-flickering motion image. This requires a rate of 24 frames/sec or greater and preferably 30 frames/sec or greater. Two or more image capture and display devices 10 can be connected to one another to enable 2-way video communication via wired, fiber optic or wireless transmission methods such as microwave, radio transmission, or infrared. Alternately, the image capture and display device 10 can be used alone to gather information about the scene in front of the device or to provide a digital mirror.

Correction for artifacts in the captured images due to the LCD panel 117 structure including diffraction effects or illumination non-uniformities from the pixel architecture, transistors, or transmission lines can be made electronically using software filtering algorithms or optically using Fourier filtering techniques. In addition, image processing may be necessary to reduce brightness non-uniformities in the displayed image. Correction algorithms can also be incorporated to correct for color or brightness artifacts in the acquired images due to the display.

Stray light from the backlight light guide 14 impinging on the image capture device(s) 16 and more specifically stray light entering the lens of the image capture device 16 can degrade the captured image quality. The invention includes a method to reduce the stray light impinging on the image capture device 16 by careful arrangement of the image capture device 16, the backlight light guide 14 and including an optional light shield 23 to block the stray light, as illustrated in FIGS. 4a and 4b. Referring to FIGS. 4a, 4b and 4c, three possible placement options for the image capture devices (16) relative to the light guide (14) are illustrated wherein like numerals indicate like parts and operation as previously discussed.

Referring to the embodiment shown in FIG. 4a, the capture device 16 is placed behind the light guide 14. If scattering elements 300 are present on the light guide 14, they are removed in the area in front of the image capture device 16 to create a window 330 or alternately if the scattering elements 300 are sufficiently far apart, the effects of the scattering elements 300 on the captured image can be reduced by post-capture image processing. In addition, if a reflective layer, reflective sheet or reflective film 310 is present in back of the backlight system, an opening is provided in front of the image capture device 16. To further reduce stray light from impinging on the image capture device 16, a light shield 23 can be added. The diameter of the light shield 23 should be large enough to enable the image capture device 16 to function unimpeded. The length of the light shield 23 should be 0.5× its diameter or longer to effectively shield any stray light from the backlight entering the lens of the image capture device 16. However, the longitudinal dimension of the light shield 23 should be kept to a minimum to reduce the overall thickness of the image capture and display device 10.

Referring to the embodiment shown in FIG. 4b, a small hole 320 is drilled (or molded) into the light guide 14 (extending either from the front as shown in FIG. 4b or alternately from the back), an opaque light shield 23 is inserted into the hole, and the image capture device 16 is inserted into the light shield 23. In this case, the image capture device 16 and light shield 23 may not add to the overall thickness of the image capture and display device 10. The scattering dots 300 and reflective sheet 310 need not be removed behind the hole 320 if the hole 320 extends from the front only partially through the light guide 14. Shadowing due to the hole 320 is then reduced by allowing the light to pass behind the hole 320 and encounter the scattering dots 300 and the reflective sheet 310 in that area.

In the embodiment shown in FIG. 4c, the image capture device 16 is inserted in a hole 320 in the light guide 14, so that the aperture of the image capture device 16 lies approximately flush with the front surface of the light guide 14. As in the other embodiments shown in FIGS. 4a and 4b, a light shield 23 could be used, however, in this case, since the image capture device is positioned flush with the front side of the light guide 14, a light shield is not needed. By eliminating the light shield 23, the tendency to produce a shadow in the area of the display adjacent to the image capture device 16 is reduced substantially due to light being able to penetrate the walls of the hole 320 as well as behind the hole 320. As a result, the uniformity of the display is improved and the displayed image quality is also improved. In addition, the hole 320 may not extend all the way through the light guide 14 so the scattering elements 300 do not need to be interrupted and a hole is not needed in the reflective sheet 310. A further benefit provide by this embodiment is that the overall thickness of the image capture and display device 10 is reduced since the image capture device 16 does not add substantially to the thickness.

For the case of image capture and display devices 10 for portable applications wherein very thin display panels are used, the overall thickness of the image capture and display device will be determined by the longitudinal dimension of the image capture device 16. Since image capture devices 16 have been designed which have a longitudinal dimension of less than 5 mm and LCD panels 117 can be very thin, an image capture and display device 10 of the type shown in FIG. 4c can be produced which is less than 5 mm in thickness.

The invention provides a thin compact device with image display and image capture capabilities. To this end, the image capture device 16 and light shield 23 must not add substantially to the thickness of the image capture and display device 10. While typical large scale television LCD devices are approximately 50 mm thick or less, in some applications such as laptop computers, the desired thickness of the LCD portion can be less than 5 mm. Consequently, the thickness of the image capture device 16 and light shield 23 can range from approximately 40 mm to less than 4 mm depending on the application wherein the difference in thickness between the image capture and display device 10 and that of the image capture device 16 is due to contributions to the thickness from the LCD display panel 117, the switchable diffuser 13, the cabinet 11 and associated electronics 20 and 21 that are located behind the display panel.

To reduce any perceived degradation of the image quality of the displayed image caused by the presence of the image capture device 16, it is important that the lateral size of the image capture device 16 be small as well. Experiments have shown that for the embodiment shown in FIG. 4a, a window 330 as large as 25 mm is substantially undetectable. In contrast, for embodiments shown in FIGS. 4b and 4c, experiments have shown that an opening 320 of 5 mm can produce a slightly darker spot or shadow adjacent to the opening 320 (the brightness of the portion of the image over the slightly darker spot can be increased to make the spot substantially undetectable in the displayed image). The tendency for the image capture device 16 to produce a perceived non-uniformity in the displayed image such as a dark spot is greater for the embodiments shown in FIGS. 4b and 4c when a light shield 23 is included than when a light shield 23 is not included, since the light shield 23 blocks the light as it moves laterally through the light guide 14. As a result, the lateral size of the image capture device 16 or the lateral size of the lens aperture for the image capture device 16 can range from 25 mm to under 5 mm depending on the embodiment.

Considering the limitations in thickness and lateral dimensions, embodiments shown in FIGS. 4b and 4c are better suited to applications such as cell phones, laptop computers and portable communication devices where a thin form factor is very important and displayed image quality and captured image quality can be less important. This is because for these embodiments, the overall thickness of the image capture and display device 10 is reduced to substantially the longitudinal dimension of the image capture device 16, however, by locating the image capture device 16 (and optionally the light shield 23) in the light guide 14, a shadow can be created in the displayed image. In contrast, the embodiment shown in FIG. 4a is better suited to thicker applications such as home televisions or desktop computer monitors where higher displayed image quality and captured image quality is desired. In this embodiment, a larger sized lens with improved optical qualities can be used in the image capture device 16 without compromising displayed image quality since the light in the light guide is not interrupted by a hole 320 or a light shield 23.

Various image capture devices 16 such as digital cameras or digital video cameras are available in the size ranges described above. In particular, small digital cameras that are well suited for use in the invention are available as image modules for cellular phones, for example, Avago Technologies (San Jose, Calif.) recently announced that it has developed a new 1.3 Megapixel image sensor model ADCC-3100 that fits into an image module that is 4.5 mm thick and 6×6 mm square with a lens that is considerably smaller than 6 mm in diameter. Smaller image modules are continuously being developed to meet the shrinking demands of portable devices. Image capture devices in the size range of 25 mm length and width are well known in the industry. To provide image capture capabilities as required by the invention, the image capture device 16 can capture individual still images, a series of images in a burst or a video clip, or a continuous stream of images as in a video. The individual still images, bursts or video clips can be captured when a particular event is detected through sound, movement or changes in lighting. Transmission of images or image data doesn't have to be continuous as the images can be temporarily stored in the image capture and display device 10 and transmission can be initiated when a particular event is detected through sound, movement, changes in lighting or analysis of the video as captured.

The resolution of the image capture device 16 should be matched to the intended use. For the case of a portable device such as a cell phone where bandwidth is limited, the resolution of the image capture device 16 when used in continuous video mode will be limited to approximately 0.1 Megapixel to 0.3 Megapixel at 30 frames/sec in the current state of technology. For non-continuous capture modes, higher resolution image capture devices 16 up to several Megapixel can be used to provide improved image quality. For home, school or business applications which can access high bandwidth connections such as cable or fiberoptic, resolutions of 0.3 to 6 Megapixel can be operated at 30 frames/sec or faster to produce good image quality in a video form. It can however be anticipated that bandwidth and resolution capabilities will be improved as technology progresses.

In terms of spectral response, the image capture device 16 can be full color, black and white or hyperspectral (ultraviolet or infrared) and combinations thereof. For video communication, full color would be beneficial. In dark environments, hyperspectral such as infrared would be useful, as it would increase the light gathering capabilities of the image capture device 16. For gathering data about the environment surrounding the image capture and display device 10, the characteristics of the image capture device can be selected to match the data that is desired such as color, black and white, ultraviolet (UV) or infrared. In addition, the sensitivity of the image capture device 16 must be matched to the environment that it will be used in. In general, high sensitivity will be required for all indoor applications so that the need for special lighting is reduced, as special lighting would be undesirable for the user. In outdoor applications where the light can change from bright sunlight to moonlight, high dynamic range will be required for the capture function to be effective. In terms of the invention, the fact that the image capture device 16 is located behind the polarizers 201, 205 in the LCD panel 117, 50% of the available light from the scene will be lost in passing through the first polarizer 205 so it will be beneficial to use an image capture device 16 with high sensitivity and low noise characteristics to enable high quality images to be captured.

In addition, it should be noted that the image capture and display device 10 can include a microphone to enable sound to be captured along with the image capture. A speaker can also be included so sound can be broadcast along with the still or video image displayed.

The captured image may also undergo image processing to reduce the effects of diffraction due to structure in the LCD panel 117. Particularly in displays with small pixels, non-transparent elements in the LCD panel 117, such as transmission lines, transistors, or color filter elements can cause diffraction that will cause image artifacts. The artifacts can be reduced by applying image correction algorithms, that include but are not limited to, the use of deblurring filters, deconvolution of the diffraction kernel, and brightness correction algorithms for example. Furthermore, the corrections may involve calibration steps to quantify the diffraction, brightness or color characteristics of the display being used, and the image capture conditions, such as object distances, capture angles, illumination levels, and the like. Another possible method to reduce diffraction artifacts is to employ Fourier optical filtering techniques to filter out spatial frequencies characteristic to the LCD panel 117. This technique requires the use of additional optics and may therefore increase the thickness of the display and capture device; alternately, a lens with a folded optical path can be employed to reduce the thickness increase.

Alternative back light arrangements can be employed to produce a uniform light panel to illuminate the display panel 117. Referring to FIG. 3b, one embodiment of the present invention requires the replacement of the light source 15 and light guide 14, with a distributed illumination panel 26, such as an organic light emitting diode (OLED) or LED panel or other panel with a distributed light source. Similar image capture device 16 placement options as in FIGS. 4a, 4b and 4c are available for these alternative back light arrangements. The switchable diffuser 13 will mask the discontinuities in the backlight due to holes or placement of image capture devices 16. The benefits of using an OLED or LED distributed illumination panel 26 are potential weight and thickness reductions, lower power, as well as less impact on the field of view of the image capture device. In one embodiment of the invention, since OLEDs and LEDs can be quickly turned OFF and ON, the distributed illumination panel 26 or portions of the distributed illumination panel 26 are turned off during image capture to reduce stray light and improve the image quality of the captured images while reducing the need for a light shield 23.

Figure 5:
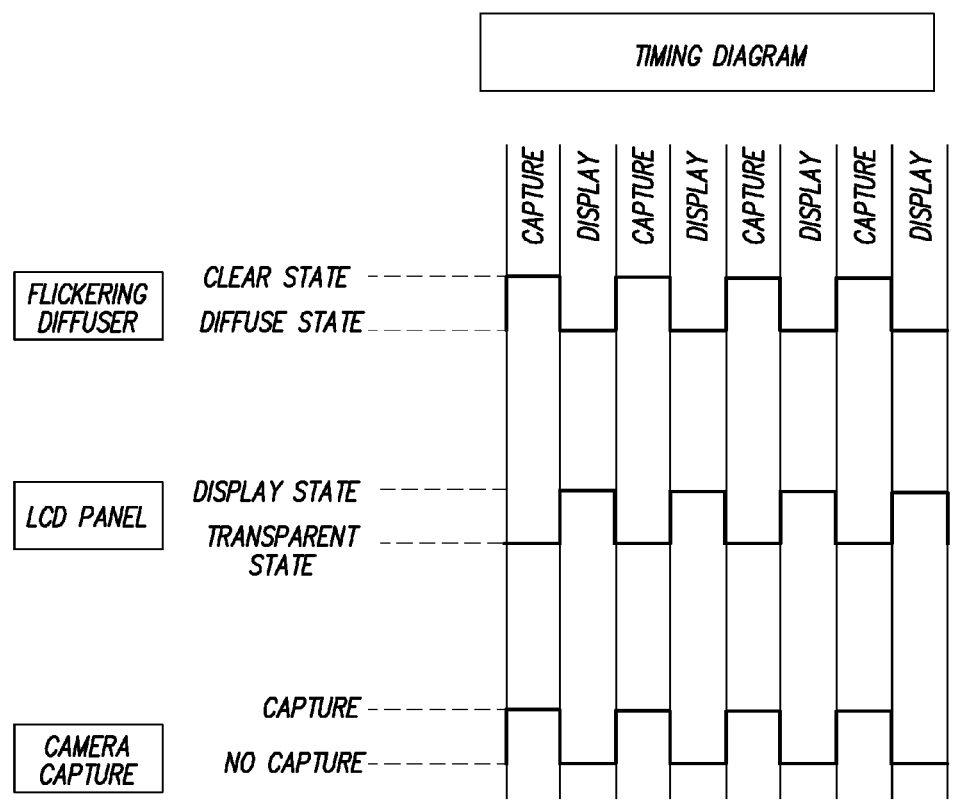
FIG. 5 is a timing diagram illustrating the relative timing of diffuser, LCD panel and image capture devices.

The timing diagram shown in FIG. 5 shows the necessary timing sequences of the switchable diffuser 13, the display panel 117 and the image capture device 16. During image capture, the flickering diffuser 13 is in its transparent state, the LCD panel is substantially transparent (a white image is impressed on the display panel at least in the area in front of the image capture device 16), so that a transparent path is provided through the LCD display panel 117 in front of the image capture device 16. During image display, the switchable diffuser 13 is in its diffuse state, the display panel 117 displays the complete image supplied by the image source, and the image capture device 16 does not capture an image. The device cycles between the image-capture and image-display states at a rate that is imperceptible to the viewer 17, requiring the displayed image to be refreshed at a rate of greater than 24 Hz.

Figure 6A:
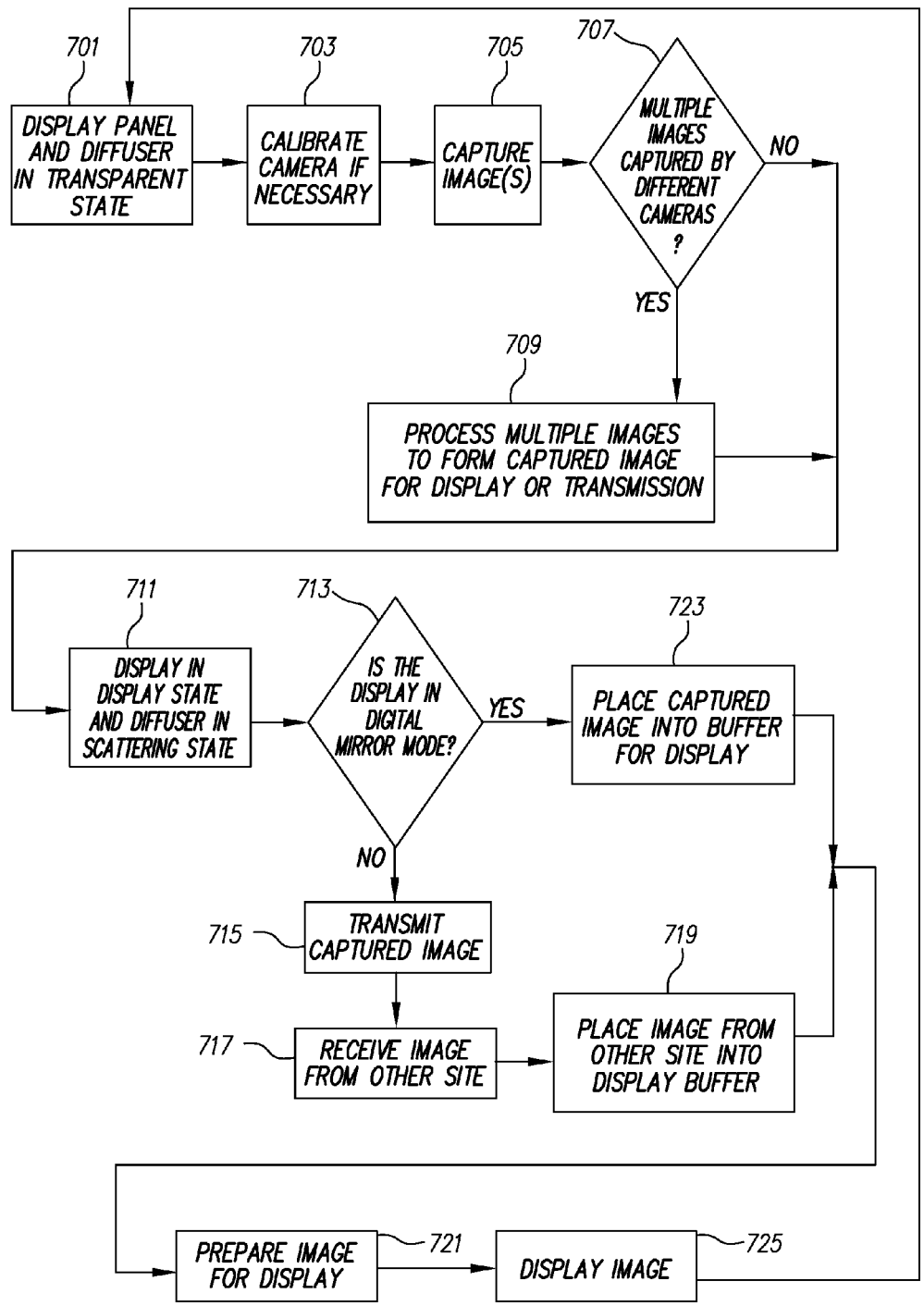
FIG. 6a is a block diagram of an image capture and display device with an LCD panel operating for communication with another similar device or as a digital mirror.

FIG. 6a illustrates an example of a flow of operation for an embodiment of the image capture and display device 10. Referring to FIG. 6a, step 701 sets the display panel 117 and the switchable diffuser 13 to the capture state wherein they are both in transparent states. If necessary, step 703, calibration of the image capture device 16 (such as a digital camera), can be invoked at this point. Calibration may involve settings adjustments such as gain adjustments for different portions of the image to compensate for artifacts in the captured image or a modification of the image to reduce diffraction artifacts in the captured image or optimization of capture conditions based on environmental conditions such as light levels. Image capture step 705 occurs next. If more than one image capture device 16 is used, the processing of multiple images, for example by preferentially selecting one image based on image content or by selecting portions of different images to form a composite image for display is invoked in step 709. At this point the display can be placed in the display state and the diffuser in the scattering state in step 711. If the apparatus is used as a digital mirror, the captured image is placed in a buffer for display in step 723. If the apparatus is used in a telecommunications mode or video communication mode, the captured image is transmitted to the remote user in step 715, an image from the remote user is received in step 717, and the received image is placed in the image buffer in step 719. The image (digital mirror image or received image) in the buffer is now prepared for display in step 721. Step 721 may include image processing steps to reduce image artifacts including applying algorithms to reduce diffraction artifacts, increase brightness or modify color in the portions of the displayed image that are located over the image capture device 16. Finally the image is displayed to the user in step 725. The process then repeats. It should be understood that the general order can be altered slightly, for example step 711 (display in display state and diffuser in scattering state) can occur just before step 725. In addition, some processes can occur in parallel, for example the transmission of an already captured image can occur during image display or image capture. Image processing to optimize image appearance as in step 721 can occur at the receiving end or transmitting end, or both.

Figure 6B:
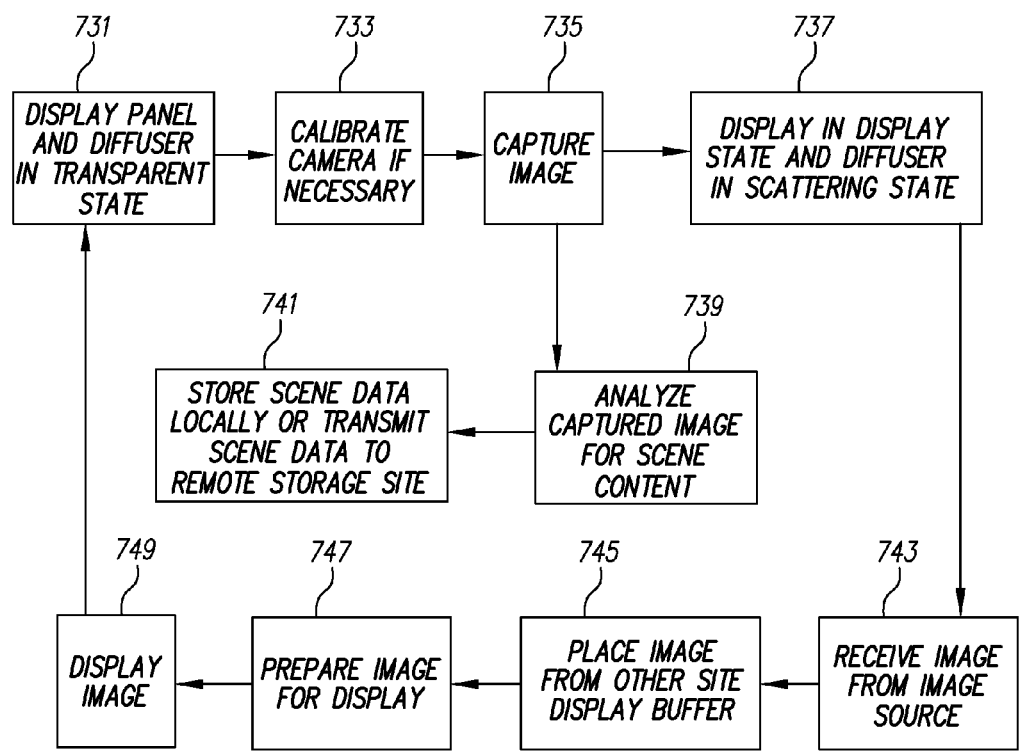
FIG. 6b is a block diagram of an image capture and display device with an LCD panel operating for unobtrusively gathering information about the scene in front of the device.

FIG. 6b illustrates an example of a flow of operation for another embodiment of the image capture and display device 10 wherein the device 10 is used to unobtrusively gather image information about the viewers and the surrounding environment. Referring to FIG. 6b, step 731 sets the display panel 117 and the switchable diffuser 13 to the capture state wherein they are both in transparent states. If necessary, in step 733, the image capture device 16 (such as a digital camera) is calibrated. The image is then captured in step 735. The process then proceeds to steps 737 and 739 substantially simultaneously. In step 737, the display panel 117 is placed in the display state and the switchable diffuser 13 in the scattering state. In step 739, the captured image is analyzed to identify important scene data in portions of the image. In step 741 scene data is stored locally or transmitted to a remote site. In step 743, an image to be displayed is received from an image source. In step 745 the image to be displayed is placed in a display buffer. In step 747, the image to be displayed is prepared for display. In step 749, the image is displayed. This process is then repeated. It should be understood that the order of steps can be altered slightly without changing the functionality of the device. For example steps 743, 745, and 747 can take place before or during step 737.

Figure 7A:
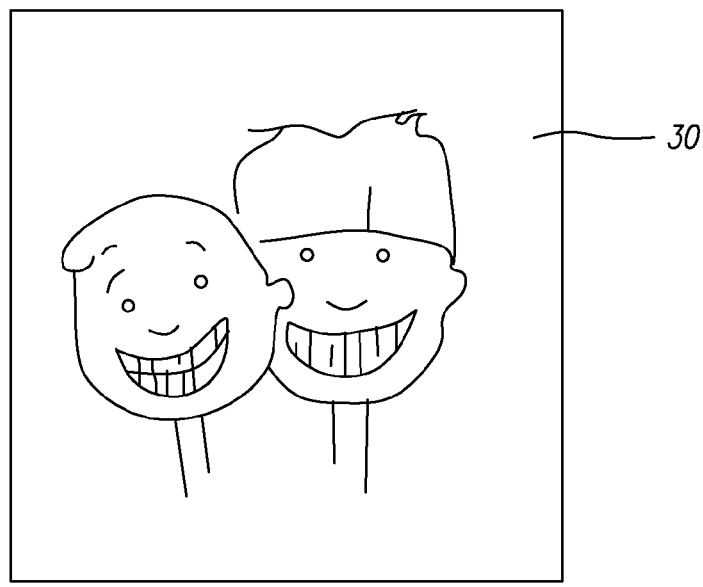
FIG. 7a is a front view illustration of a displayed image for an image capture and display device with a composite diffuser when the device is in the display state.
Figure 7B:
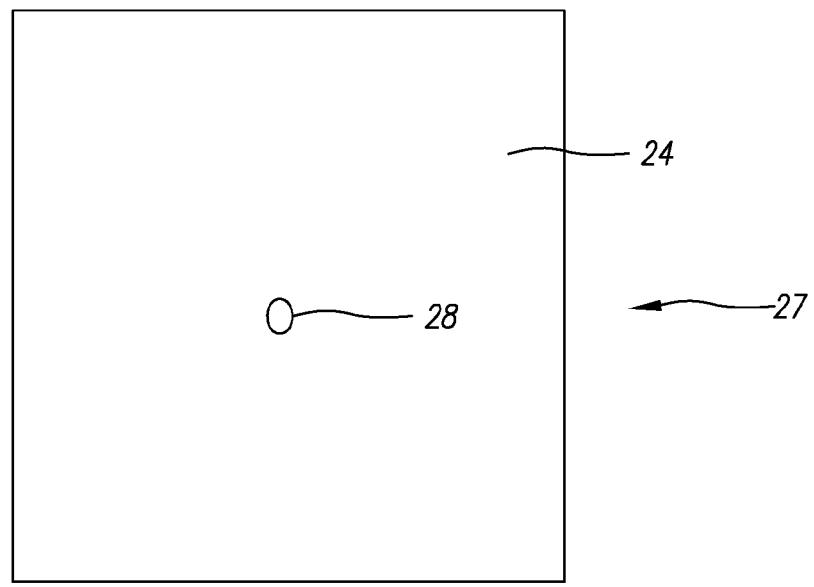
FIG. 7b is a front view illustration of a composite diffuser for an image capture and display device with a composite diffuser when the device is in the display state.
Figure 8A:
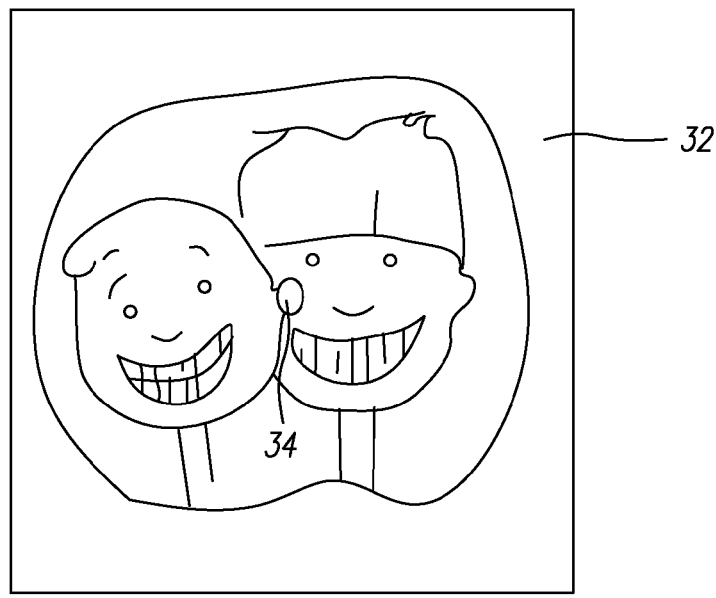
FIG. 8a is a front view illustration of a displayed image for an image capture and display device with a composite diffuser when the device is in the capture state.
Figure 8B:
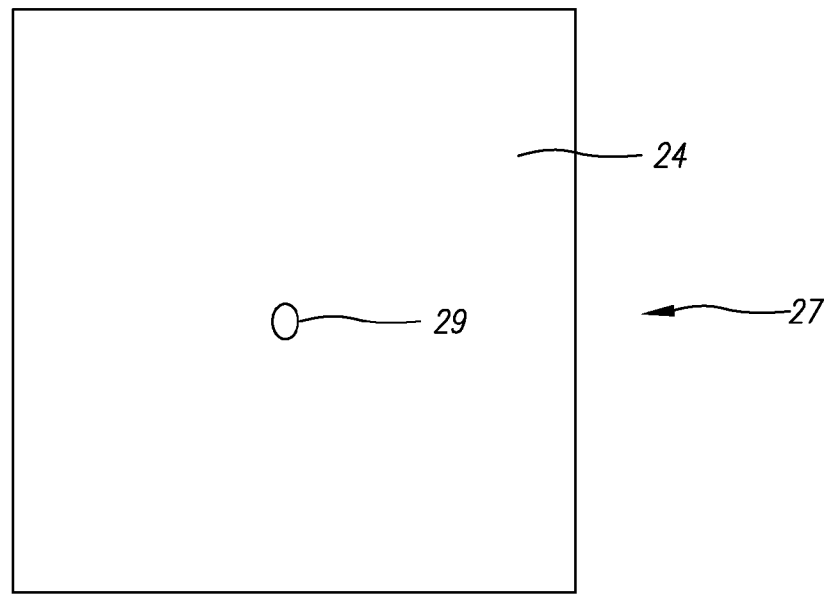
FIG. 8b is a front view illustration of a composite diffuser for an image capture and display device with a composite diffuser when the device is in the capture state.

FIGS. 7a, 7b, 8a, and 8b show a further embodiment of the invention. In this embodiment, the composite diffuser 27 is comprised largely of a non-switchable diffuser 24 wherein at least one portion of the composite diffuser 27 is a switchable diffuser 13. Wherein the portion of the composite diffuser 27 that is a switchable diffuser 13 is located in front of the image capture device 16 and of substantially the same size as the image capture device 16 or preferably the portion of the composite diffuser 27 is slightly larger than the image capture device to allow the light to enter the lens of the image capture device 16 unimpeded. The switchable diffuser 13 can be rapidly switched from a diffusive display state 28 and to a transparent capture state 29. The switchable diffuser 13 is operated in the diffusive display state 28 when the image capture and display device 10 is in the display state. The switchable diffuser 13 is operated in the transparent state 29 when the image capture and display device 10 is in the capture state. When the image capture and display device 10 is in the capture state, a modified image is displayed wherein the portion of the image that is adjacent to the portion of the composite diffuser 27 that is a switchable diffuser 13 is replaced with a white image to make it transparent in the area over the image capture device 16. It should be noted that the image capture device 16 is aligned with the portion of the composite diffuser 27 that is a switchable diffuser 13 and the portion of the LCD panel 117 displaying the white image. FIGS. 7a and 7b show the displayed image and the composite diffuser 27 for the display state. FIG. 7a shows a displayed image 30. FIG. 7b shows the composite diffuser 27 comprised of a non-switchable portion 24 and a switchable diffuser portion, which is shown in its diffusive display state 28. FIGS. 8a and 8b show the displayed image and the composite diffuser 27 for the capture state. FIG. 8a shows the displayed image 32 with a portion of the image has been replaced by a small white area 34 (wherein the LCD is transparent) in the center of the image over the image capture device 16. FIG. 8b shows the composite diffuser 27 wherein the switchable portion is in the transparent state 29.

In regard to image artifacts in the displayed image, it should be noted that to maintain uniform brightness in the displayed image as perceived by a viewer 17, the local brightness of the portion of the image in the region of the image capture device 16 will need to be increased relative to the brightness of the surrounding areas of the displayed image. Increased brightness is needed to compensate for the time that the display is in the transparent capture state when the portion of the image in the region of the image capture device 16 is replaced with a white area. It should be noted that the need for local brightness or color adjustments due to this effect is reduced if the entire display is put into the transparent capture state. Increased brightness in the portion of the image in the region of the image capture device is also needed to reduce the shadow created by the hole 320, the light shield 23 or window 330 in the backlight light guide 14 for the image capture device 16. Putting the entire switchable diffuser 13 into the transparent capture state reduces the need for local image adjustments but then adjustments may be required to compensate for image artifacts produced by the scattering elements 300 on the light guide 14. In any case, compensating local adjustments to the brightness or color in the portion of the displayed image in the region of the image capture device 16 can be done with a calibration step and then applied in Step 721 to improve display uniformity.

Figure 9:
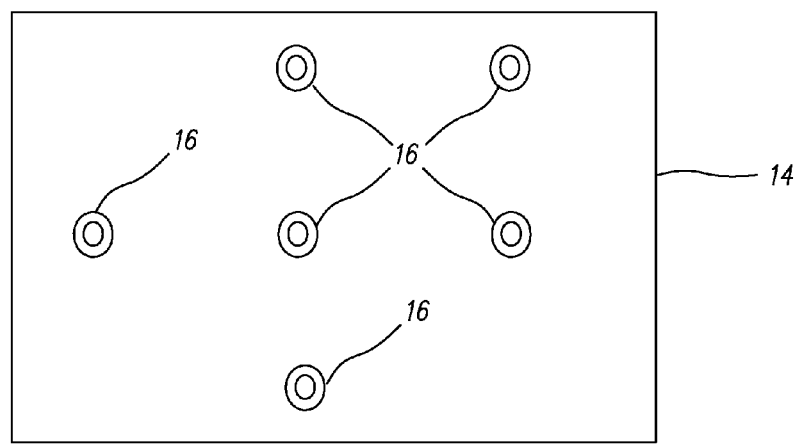
FIG. 9 is a front view schematic of the light guide illustrating the optional placement of multiple image capture devices.

FIG. 9 shows an embodiment wherein multiple image capture devices 16 are located behind the LCD panel 117. The image capture devices 16 can all have the same image capture capabilities or alternately they can have different combinations of image capture capabilities including: still image capture, burst capture, video capture, lens field of view, lens focal length, sensor resolution, lens f number, spectral response, light sensitivity, color filter array patterns (red, green, blue or, panchromatic). The images captured from each of the multiple image capture devices 16 can be used individually or portions of more than one image can be stitched together to form a composite image. In this case, the diffuser may be entirely a switchable diffuser 13 or portions of the diffuser located in front of each image capture device 16 may be switchable diffusers 13. In addition, the technique used to reduce stray light from impinging on the image capture devices 16 may be different for each of the multiple image capture devices as best suited to the location of the image capture device 16 within the light guide 14 or the LCD panel 117. Multiple camera options and controls for an image capture and display device are described in detail by Border in U.S. patent application Ser. No. 11/756,562, filed May 31, 2007.

In a further embodiment with multiple image capture devices 16, each image capture device 16 is associated with a switchable diffuser 13 that is a portion of a diffuser 109, the timing of the display stage and image capture stage can be different for each image capture device 16. In an alternate embodiment, the switchable diffuser 13 may be made to cover the entire display area but with local pixel regions that can be controlled individually so the portions of the switchable diffuser 13 over the image capture devices 16 can be switched independently between the diffusive display state and the transparent capture state. In the event that one of the multiple image capture devices 16 is not being used, the portion of the switchable diffuser 13 can be left in the diffusive state. It should be noted that adjustments to the brightness or color of each portion of the image that correspond to a switchable diffuser 13 that is a portion of the diffuser 109 will need to be done to compensate for the time that the portion of the image is not displayed during the capture state to improve display uniformity.

The following will provide examples of various embodiments and modes of operation of an image and capture device made in accordance with the present invention. It should be understood that these embodiments may utilize standard backlighting means (fluorescent lights, cold cathode ray tubes, or LED's) or distributed illumination panel 26 backlight, as for example with an LED array or OLED panel behind the display. It should also be understood that all embodiments could utilize a variety of image capture apparatus, for example but not limited to, commonly available cameras, video web-cameras, other small form factor digital camera assemblies, CCD or CMOS sensors with appropriate lenses for focusing, distributed sensors and lenslets, distributed lens (Fresnel lens) and sensors, switchable Fresnel lens or other fast switchable lenses with appropriate sensors. Associated optics to image the region in front of the display can be integrated into the sensor package or can be separate optical components such as refractive or diffractive lenses or other devices and procedures allowing the capture or synthesis of an in-focus image (such as wavefront coding.)

In a first embodiment, a LCD image capture and display device is set up for capturing and displaying images along a single optical axis. The device includes the modifications necessary to enable the LCD display device to function as an image capture and display device that captures an image of a scene in front of the display. The diffusing films that normally lie in front of the backlighting system are replaced with a switchable diffuser. An image capture device is placed behind the LCD display and the switchable diffuser. The display is placed in a capture state in which the LCD is transparent by impressing a white image on the display at least in front of the image capture device and by causing the switchable diffuser to become clear. During the capture state, the image capture device captures the image. The display can also be placed in a display state by causing the switchable diffuser to be in its diffusive state, and impressing images on to the LCD panel as provided from an image source. A control system alternately places the image capture and display device in the display state and capture state such that an image can be viewed on the display screen and an image of an object can be captured in a manner such that said alternating between the display state and capture states is imperceptible to a viewer of the display panel.

In a second embodiment, a LCD display device has the modifications necessary to function as an image capture and display device that provides good eye contact of users, by providing an image capture device behind the display just above the center position at approximately eye level when the face of a person is displayed and also has appropriate components to provide for communication over a communication network, for example, but not limited to a wireless communication network, an internet communication, and a telephone communication network. In this embodiment, the image capture and display device is linked to a second image capture and display device that is located at a remote site so that video communication can be conducted with the remote site. A microphone and speaker may also be provided to enable audio communication to go with the visual communication. In addition, face detection algorithms as are well known in the art, can be used to identify the face of the person in the image being displayed. The displayed image can then be adjusted so the eyes of the displayed person are substantially in the region of the image capture device. Good eye contact between the remote and local viewers can thus be created, anticipating that the viewer will mostly look at the eyes of the person in the displayed image and consequently look directly at the image capture device.

In a third embodiment, a LCD display device is modified to function as an image capture and display device such as the one described in embodiments 1 or 2, with the additional modification that multiple image capture devices are distributed across the display, such that wide angle and close-up captures of the complete area in front of the display are possible. Computer or manual control can select which view or views from the multiple image capture devices are displayed and how they are displayed. The images captured can be stills, bursts, video clips or continuous video. In addition, face detection algorithms can be used to identify the face in an image and then select an image capture device to be used that is located near the detected face to capture the best eye contact of the viewer anticipating that the viewer will mostly look at the detected face in the displayed image.

In a fourth embodiment, an image capture and display device such as the ones described in embodiments 1, 2, or 3, is further modified to provide the additional feature that electronic image correction such as digital filtering, disconsolation, intensity corrections, or other image processing allows reduction of image artifacts due to diffraction effects from the display panel, brightness non-uniformities due to the back lighting mechanism, and other possible illumination artifacts or color artifacts due to the elements lying in front of the image capture device (such as display panel transmission lines, thin film transistors (TFT's)), scattering dots in backlight, etc.)

In a fifth embodiment, an image capture and display device such as the ones described in embodiments 1 through 4, may be placed in an operation mode so that the device also functions as a digital mirror by displaying the image of what is in front of the image capture and display device on the display.

In a sixth embodiment, an image capture and display device such as the ones described in embodiments 1 through 5, with the additional feature that selection of the mode of operation (video communication mode or digital mirror mode or gathering image information mode) can be made by the user or by computer based on motion detection algorithms, facial detection and the like.

In a seventh embodiment, an image capture and display device such as the ones described in embodiments 1 through 6, is comprised of a transflective LCD instead of a transmissive LCD, thus improving the display luminance in high ambient lighting situations and offering the potential to save battery power. In a transflective LCD, part of each pixel functions as a reflective-type and part as a transmission-type LCD. Capture could occur through the transmissive part as described above, or in the reflective part by providing apertures in the reflective surface or by causing a portion of the reflective surfaces to become transparent. Wherein a portion of the reflective surface can be made to be transparent by mechanically opening a window in the reflective surface or by rotating them, by such means as MEM's structures.

In an eighth embodiment, the image capture and display device is a television or computer monitor. The image capture device is used for the purpose of unobtrusively gathering image information about the viewers and the environment surrounding the image capture and display device. The image information is used to tailor, modify or select the image presented to the viewers. In this case, a high quality captured image may not be required so the image capture device can have as low as 0.1 Megapixel resolution and may be black & white imaging only. In addition, continuous image information may not be required so a still image can be captured periodically to reduce the volume of image information; alternately portions of the image can be utilized for information. The image information can be transmitted to a remote site for storage and processing.

Figure 10:
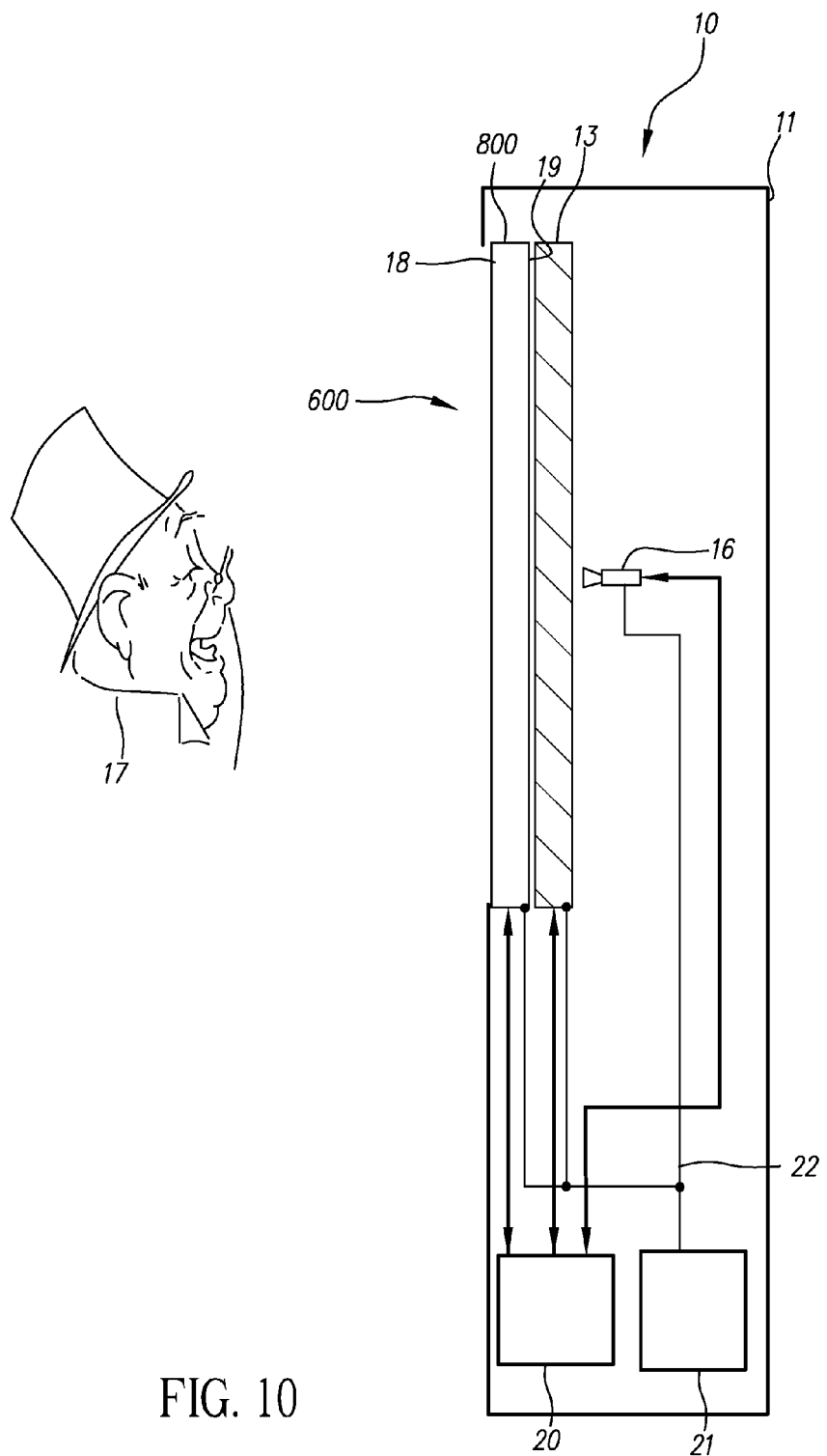
FIG. 10 is a cross-sectional schematic diagram of an image capture and display device according to another embodiment of the present invention showing a transparent active display panel.
Figure 11A:
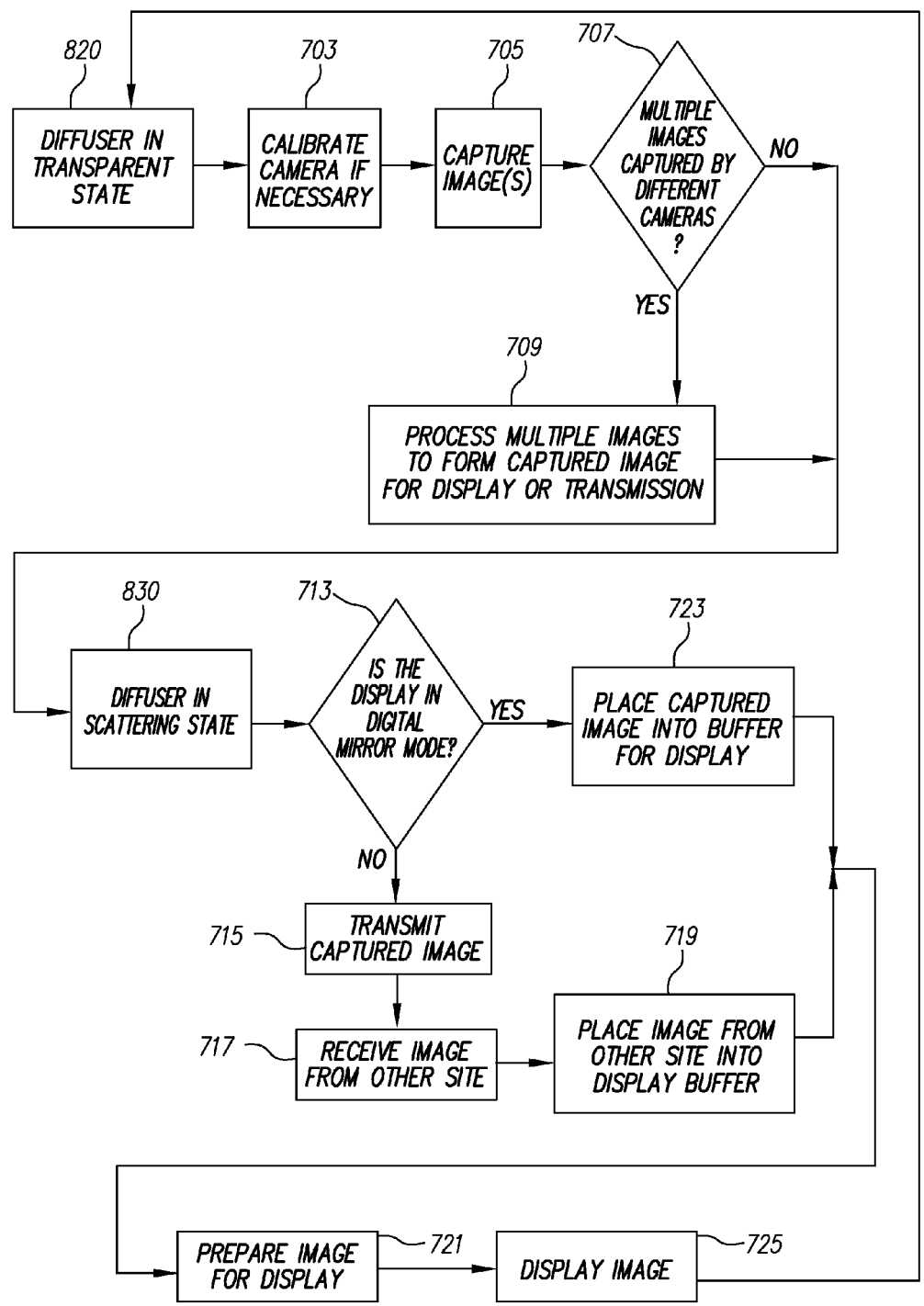
FIG. 11a is a block diagram of an image capture and display device with a transparent active display panel operated for communication with another similar device or as a digital mirror.
Figure 11B:
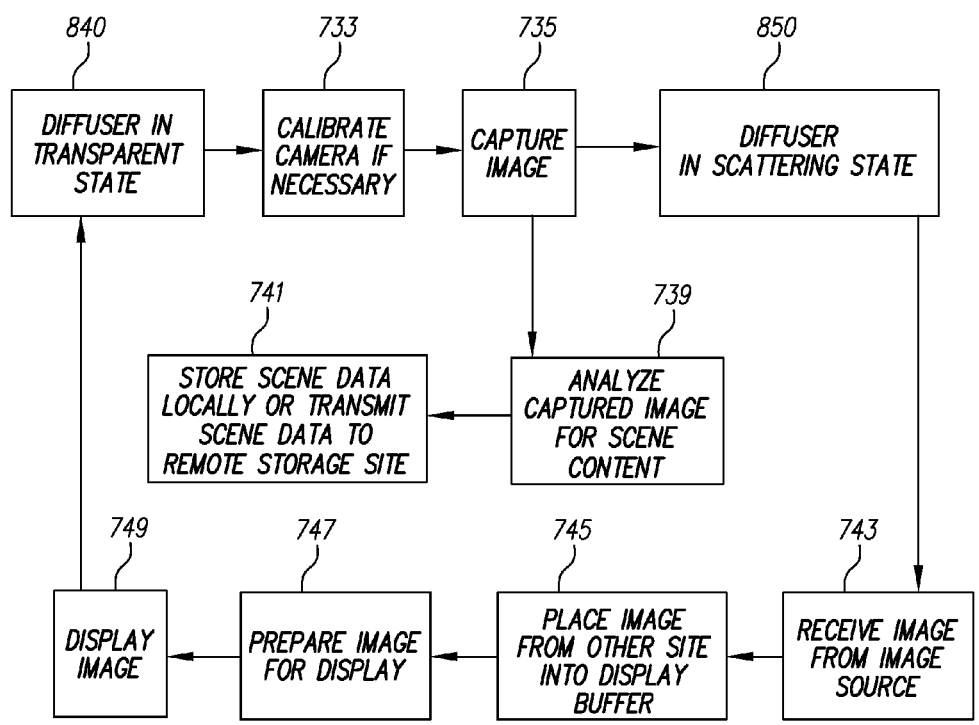
FIG. 11b is a block diagram of an image capture and display device with a transparent active display panel operating for unobtrusively gathering information about the scene in front of the display.

In a ninth embodiment, the image capture and display device 10 is comprised of a transparent active display panel as shown in FIG. 10 where like numerals indicate like parts and operation as previously discussed. In this embodiment, the transparent active display panel 800 provides its own light so that a backlight panel is not required. Examples of transparent active display panels 800 include OLED, electroluminescent or LED panels. Referring to FIG. 10, the switchable diffuser 13 is located behind the transparent active display panel 800. The switchable diffuser 13 then acts to mask the presence of the image capture device 16 that is located behind the switchable diffuser 13. In addition, the switchable diffuser 13 can act as a reflector when in its scattering state to reflect light toward the viewer 17 in front of the image capture and display device 10 to increase the brightness of the display as perceived by the viewer 17. Flow charts showing the operation of the image capture and display device 10, as described in this embodiment, are shown in FIGS. 11*a* and 11*b*, where like numerals indicate like steps and functions as previously described. In FIG. 11*a*, in step 820 the diffuser is in the transparent state while in step 830 the diffuser is in the scattering state. In FIG. 11*b*, in step 840 the diffuser is in the transparent state while in step 850, the diffuser is in the scattering state. The remaining steps in FIGS. 11*a* and 11*b* remain as described for the previous embodiments.

While the foregoing describes various modification and operational uses of the present invention, a single device may be provided that incorporates some or all of the various combinations and operational variations, whereby the user may select the desired mode of operation from the various modes of operation.

It is to be understood that various other modifications and changes may be made with out departing from the scope of the present invention, the present invention being defined by the claims that follow.

Parts List

10 Image capture and display device
11 Cabinet or enclosure
13 Switchable diffuser
14 Backlight light guide
15 Backlight light source
16 Image capture device
17 Viewer
18 Front display side of display panel
19 Back side of display panel
20 Computer and drivers
21 Power Supply
22 Electrical leads
23 Light shield
24 Non-switchable diffuser
26 Distributed illumination panel
27 Composite diffuser
28 Switchable diffuser in diffuse state
29 Switchable diffuser in transparent state
30 Displayed image with the image capture and display device with a composite diffuser in the display state
32 Displayed image with the image capture and display device with a composite diffuser in the capture state wherein a portion of the image is a white image to create a transparent area over the image capture device
34 A portion of the displayed image that is a switched to a white spot to create a transparent area over the image capture device
100 LCD display assembly
101 Mechanical frame
103 TCP drivers
105 Interface controller
107 Backlight system
109 Diffuser
111 Light guide
113 Backlight bulb
117 LCD panel
119 Inverter
201 Front side polarizer
205 Back side polarizer with polarization direction perpendicular to polarizer 201
209 Liquid crystal molecules
211 Glass plates with transparent electrodes
220 Reflective layer, sheet or film
230 Scattering elements or dots
300 Scattering elements or dots
310 Reflective layer, sheet or film
320 Opening
330 Window
340 Backlight system
600 Opening in Cabinet
701 Step where display is in capture state and diffuser is in transparent state
703 Calibration step
705 Capture image step
707 Step to determine if multiple images were captured
709 Step where multiple images are processed
711 Step where display is in display state and diffuser is in diffusing state
713 Step to determine if display is operating in digital mirror mode
715 Step to transmit a captured image
717 Step to receive an image from another site
719 Step to place received image into a display buffer
721 Step to prepare the image to be displayed
723 Step to place a captured image into a display buffer 725 Step to display an image
731 Step where display is in capture state and diffuser is in transparent state
733 Calibration step
735 Capture image step
737 Step where display is in display state and diffuser is in diffusing state
739 Step where the captured image is analyzed for scene content
741 Step where scene data is stored locally or transmitted to a remote storage site
743 Step where an image is received from an image source
745 Step where image is placed into a display buffer
747 Step where the image is prepared for display
749 Display image step
800 Transparent active display panel
820 Step where the diffuser is in the transparent state
830 Step where the diffuser is in the scattering state
840 Step where the diffuser is in the transparent state
850 Step where the diffuser is in the scattering state

The invention claimed is:

1. An image capture and display device, comprising:
   a. a display panel having a front display side and a back side, said display panel being capable of being alternately placed in a first state for display of an image and a second state wherein at least a portion of said display panel is substantially transparent;
   b. a backlight device disposed behind said display panel for providing a substantially uniform light to the back side of said display panel, said backlight device comprising a uniform light panel having a front surface facing the back side of said display panel, a back surface, a reflective layer is provided at the back surface, and a light source for providing light to said uniform light panel, said reflective layer causing light from said light source to be directed toward said display panel;
   c. a diffusing element placed between said display panel and said backlight device, said diffusing element having at least a portion thereof capable of being alternately placed in a first state wherein said portion is substantially transparent and a second state wherein said diffusing element diffuses the light from said uniform light panel being transmitted to said display panel; and
   d. an image capture device positioned behind said diffusing element for capturing an image of a scene positioned in front of said display panel, said image capture device being positioned substantially adjacent to or integrally with said uniform light panel.

2. An image capture and display device according to claim 1 wherein
   said image capture device is positioned such that it is aligned with said portion of the diffusing element and said portion of the display panel.

3. An image capture and display device according to claim 1 wherein said display panel comprises a LCD display panel.

4. An image capture and display device according to claim 1 wherein said image capture device comprises any one or more of the following: CCD, CMOS, image modules, digital still camera, digital video camera.

5. An image capture and display device according to claim 1 wherein a light shield is positioned around the image capture device such that impinging light from the uniform light panel is blocked from entering the lens of the image capture device.

6. An image capture and display device according to claim 1 wherein said image capture device comprises multiple digital cameras with one or more different image capture characteristics such as: still capture, video capture, burst capture, lens field of view, lens focal length, sensor resolution, spectral response, lens f number, light sensitivity, or color filter array patterns.

7. An image capture and display device according to claim 1 wherein said image capture device is positioned in the central region of the display.

8. An image capture and display device according to claim 1 wherein said image capture device comprises multiple digital cameras positioned across the display area to provide different fields of view of the scene in front of the display.

9. An image capture and display device according to claim 1 wherein said image capture device is positioned in an opening in the uniform light panel to reduce the thickness of the image capture and display device.

10. An image capture and display device according to claim 1 wherein said image capture device is positioned in the uniform light panel such that the lens is positioned at the front surface of the uniform light panel.

11. An image capture and display device according to claim 1 wherein the image capture device is integral with said uniform light panel.

12. An image capture and display device according to claim 1 herein said image capture device has thickness no greater than about 5 mm.

13. An image capture and display device according to claim 1 herein said uniform light panel comprises a light guide panel.

14. An image capture and display device according to claim 1 herein said uniform light panel comprises a distributed illumination panel.

15. A method for capturing and displaying an image using an image capture and display device having a display panel having a front display side and a back side, said display panel being capable of being alternately placed in a first state wherein at least a portion of said display panel is substantially transparent and a second state wherein an image can be displayed on said display panel, a uniform light panel disposed behind said display panel for providing a substantially uniform light to the back side of said display panel, a diffusing element placed between said display panel and said uniform light panel, portions of said diffusing element being capable of being alternately placed in a first state wherein said diffusing element is substantially transparent and a second state wherein said diffusing element diffuses the light from said uniform light panel being transmitted to said display panel; and an image capture device positioned behind said diffusing element, for capturing an image of a scene positioned on the other side of said display panel, comprising the steps of:
   a. alternating a portion of said diffusing element between said first and second states at a rate that is not noticeable by an observer of said device;
   b. alternating said display panel between said first and second states at a rate that is not noticeable by an observer of said device
   c. providing an image on said display panel when said display panel is in said second state and when said diffusing element is in said second state; and
   d. capturing an image of a scene by said image capture device when said diffusing element is in said first state and said display panel is in said first state.

16. The method according to claim 15 wherein said rate is equal to or greater than 24 Hz.

17. The method according to claim 15 wherein said image capture device is positioned substantially adjacent to or integrally with said uniform light panel.

18. The method according to claim 15 wherein said portion of said diffusing element be substantially the same size as said image capture device and is positioned in alignment with said image capture device.

19. The method according to claim 15 wherein the device is used to unobtrusively capture image information of viewers and the environment surrounding the image capture and display device.

20. The method according to claim 19 wherein the image information is transmitted to a remote site for storage or analysis.

21. The method according to claim 19 wherein the image information is used to tailor, modify or select the image presented to the viewer.

22. The method according to claim 15 wherein said image and capture display device includes communication capabilities further comprising the step of two of said image and capture display devices are used for video communication over communication network.

23. An image capture and display device, comprising:
a. a display panel having a front display side and a back side, said display panel being capable of being alternately placed in a first state for display of an image and a second state wherein at least a portion of said display panel is substantially transparent;
b. a diffusing element placed behind said display panel, said diffusing element having at least a portion thereof capable of being alternately placed in a first state wherein said portion is substantially transparent and a second state wherein said diffusing element diffuses the light from said uniform light panel being transmitted to said display panel; and
c. an image capture device positioned integrally or adjacent to said diffusing element for capturing an image of a scene positioned on the other side of said display panel.

24. An image capture and display device according to claim 23 wherein said display panel comprise an OLED, electroluminescent or LED display panel.

* * * * *